United States Patent
Nishioka et al.

(10) Patent No.: US 7,412,911 B2
(45) Date of Patent: Aug. 19, 2008

(54) STEERING COLUMN APPARATUS

(75) Inventors: Masaki Nishioka, Gunma (JP); Naoki Sawada, Gunma (JP)

(73) Assignees: NSK, Ltd., Tokyo (JP); NSK Steering Systems Co., Ltd., Tokyo (JP)

( * ) Notice: Subject to any disclaimer, the term of this patent is extended or adjusted under 35 U.S.C. 154(b) by 692 days.

(21) Appl. No.: 10/941,808

(22) Filed: Sep. 16, 2004

(65) Prior Publication Data

US 2005/0081674 A1    Apr. 21, 2005

(30) Foreign Application Priority Data

Sep. 17, 2003  (JP)  ............. P.2003-325106

(51) Int. Cl.
*B62D 1/18* (2006.01)

(52) U.S. Cl. ............. 74/493; 74/492; 280/777

(58) Field of Classification Search ............ 74/492, 74/493; 280/775, 777
See application file for complete search history.

(56) References Cited

U.S. PATENT DOCUMENTS 5,363,716 A * 11/1994 Budzik et al. ............... 74/493
5,687,990 A * 11/1997 Uphaus ...................... 280/775
6,189,405 B1 * 2/2001 Yazane ........................ 74/493
6,543,807 B2 * 4/2003 Fujiu et al. .................. 280/775
6,902,192 B2 * 6/2005 Sato et al. .................... 280/775
2004/0159173 A1 * 8/2004 Sawada ........................ 74/492

FOREIGN PATENT DOCUMENTS

| GB | 2 281 375 A | 3/1995 |
| JP | 63-114771 U | 7/1988 |
| JP | 63-117662 U | 7/1988 |
| JP | 4-110671 U | 9/1992 |
| JP | 2588338 Y2 | 1/1999 |

* cited by examiner

*Primary Examiner*—David M Fenstermacher
(74) *Attorney, Agent, or Firm*—Sughrue Mion, PLLC

(57) ABSTRACT

A steering column apparatus includes: a stationary column member; a movable column member whose one end is supported on the stationary column member nonrotatably about a center axis and movably along the center axis; a column head disposed on the other end of the movable column member; a wheel shaft supported rotatably on the column head; a column clamp for clamping and unclamping the movable column member with respect to the stationary column member at two or more points which are spaced along the center axis of the movable column member; and a control lever whose operation lever end is positioned in the vicinity of a steering wheel and which is capable of operating the column clamp.

14 Claims, 10 Drawing Sheets

US 7,412,911 B2

STEERING COLUMN APPARATUS

BACKGROUND OF THE INVENTION

1. Field of the Invention

The present invention relates to a steering column apparatus for a vehicle, and more particularly to a steering column apparatus for a vehicle having a telescopic mechanism.

2. Background Art

A telescopic mechanism for a steering column is a mechanism for adjusting the position of a steering wheel in the fore-and-aft direction to an easiest-driving position so as to adapt to the physical constitution and a preference of a driver.

The telescopic mechanism includes a clamping/unclamping mechanism operated when the driver adjusts the position of a steering wheel in the fore-and-aft direction (i.e., along the axis of the steering column). During the adjustment, the clamping/unclamping mechanism is temporarily unclamped, its position is adjusted in the fore-and-aft direction under the unclamped state, and the mechanism is subsequently returned to the clamped state.

Such a clamping/unclamping mechanism is disclosed in GB-2281375A, in which a steering column provided with a single control lever which can be operated without the driver releasing a hand from the steering wheel.

In the steering column of the cited British publication, a clamping/unclamping section of the telescopic mechanism has employed a method where a single clamping member is pressed onto a telescopic pipe so as to effect clamping. Therefore, even when a column head—which is heavy because it includes a steering wheel or an inflator for an air bag—is clamped by means of a single clamping member, the column head can be easily moved while the clamping point is used as a pivot. Further, even when the clamping force is increased, looseness is inevitably generated when the clamping section is subjected to vibrations or the like, because the clamping section has insufficient rigidity.

SUMMARY OF THE INVENTION

The present invention aims at providing a steering column having a column clamping/unclamping mechanism having high clamping rigidity and with which a stationary column member is not loosened in relation to a stationary column member when subjected to vibrations or the like.

Further, the invention aims at providing a steering column which enables easy operation of a control lever for operating the column clamping/unclamping mechanism; in which column clamping force is easily adjusted; and which enables stable clamping/unclamping operation without inducing biting during clamping/unclamping.

Furthermore, the invention aims at providing a steering column which enables clamping/unclamping of a column and clamping/unclamping of tilt head by means of operation of a single control lever.

The invention provides a steering column apparatus including: a stationary column member having a body mount section by means of which the steering column apparatus is attached to a vehicle body; a movable column member whose one end is supported on the stationary column member nonrotatably about a center axis and movably along the center axis; a column head disposed on the other end of the movable column member; a wheel shaft which is supported rotatably on the column head and which fixes a steering wheel on one end; a column clamp for clamping and unclamping the movable column member in relation to the stationary column member at two or more points which are spaced along the center axis of the movable column member; and a control lever whose operation lever end is positioned in the vicinity of the steering wheel and which is capable of operating the column clamp.

BRIEF DESCRIPTION OF THE DRAWINGS

The present invention may be more readily described with reference to the accompanying drawings.

DETAILED DESCRIPTION OF THE PREFERRED EMBODIMENTS

Embodiments of the present invention will be described with reference to the drawings.

General Outline

Figure 1:
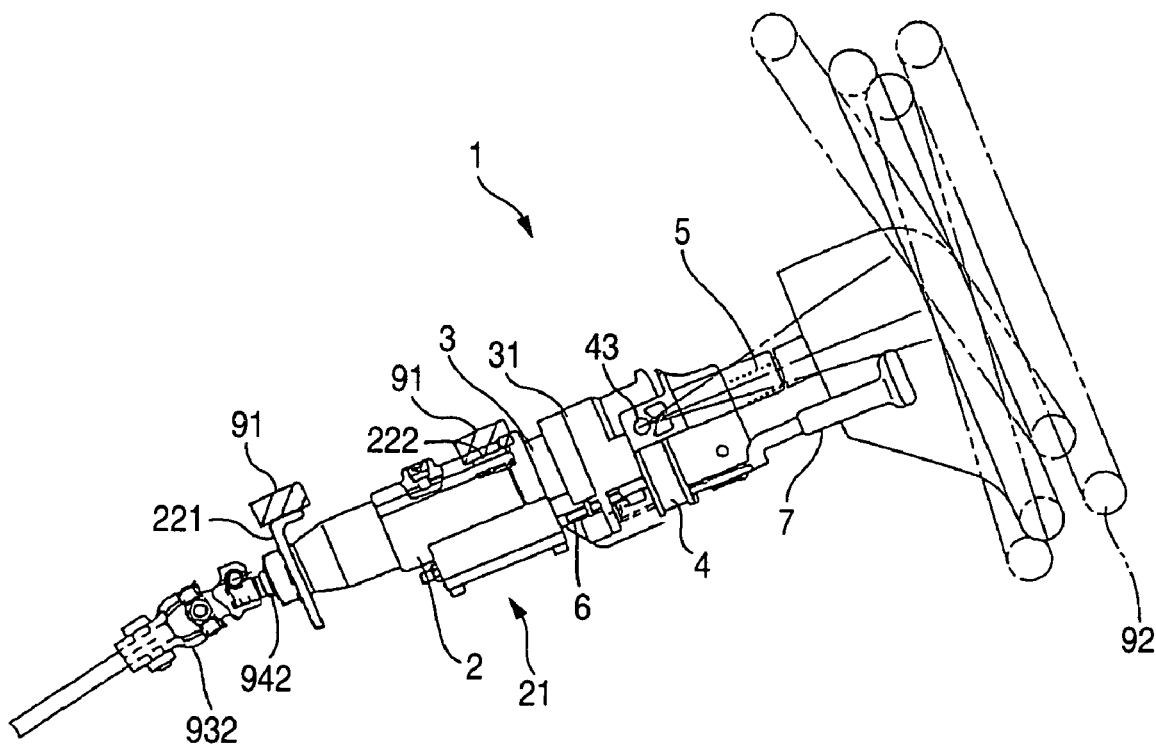
FIG. 1 is an external view of a steering column 1 according to an embodiment of the present invention.

FIG. 1 is an external view of a steering column 1 according to an embodiment of the present invention. The steering column 1 has a stationary column member 2, a movable column member 3, a column head 31, a tilt head 4, a wheel shaft 5, a column clamp 21, a tilt head clamp 41 (see FIG. 2), a control lever 7, and a mechanical transmission device.

The stationary column member 2 has body mount sections 221, 222. The stationary column member 2 is attached to a vehicle body 91 by means of the body mount sections 221, 222. One end of the movable column member 3 is supported on the stationary column member 2 nonrotatably about the Center axis and movably along the center axis.

The column head 31 is disposed on the other end of the movable column member 3. On the column head 31, the tilt head 4 is supported so as to allow tilting about a TILT CENTER AXIS 43. The wheel shaft 5 is rotatably supported on the tilt head 4. Further, a steering wheel 92 is fixed on one end of the wheel shaft 5.

The column clamp 21 is disposed on the stationary column member 2. On the column clamp 21, a column clamp shaft 6 is disposed rotatably about an axis parallel to the center axis of the movable column member 3. The column clamp shaft 6 is movable in relation to the column head 31. The movable column member 3 can be brought into a clamped/unclamped state by means of rotation or parallel displacement of the column clamp shaft 6.

The tilt head clamp 41 is disposed on the column head 31. The tilt had clamp 41 clamps and unclamps the tilt head 4 in relation to the column head 31. The control lever 7 is supported on the tilt head 4 by means of a pivot shaft. The driver can operate the control lever 7 without releasing a hand from the steering wheel 92.

The swaying motion of the control lever 7 is converted into rotation or parallel displacement of the column clamp shaft 6 via the mechanical transmission device. The rotation or parallel displacement is transmitted to the column clamp 21, whereby clamping/unclamping of the movable column member 3 is performed. Furthermore, the swaying motion of the control lever 7 is also transmitted to the tilt head clamp 41, whereby clamping/unclamping of the tilt head 4 is performed.

The wheel shaft 5 is connected at one end to an unillustrated universal joint in the steering column 1. The wheel shaft 5 is further connected to a mechanism for controlling a direction of a front wheel through a pair consisting of an upper intermediate shaft 941 (FIG. 6) and a lower intermediate shaft 942 which are spline-engaged, and a lower universal joint 932. Note that the dotted lines in FIG. 1 indicate some example positions and orientations that can be assumed by the steering wheel 92.

Tilt Head Clamp

Figure 2:
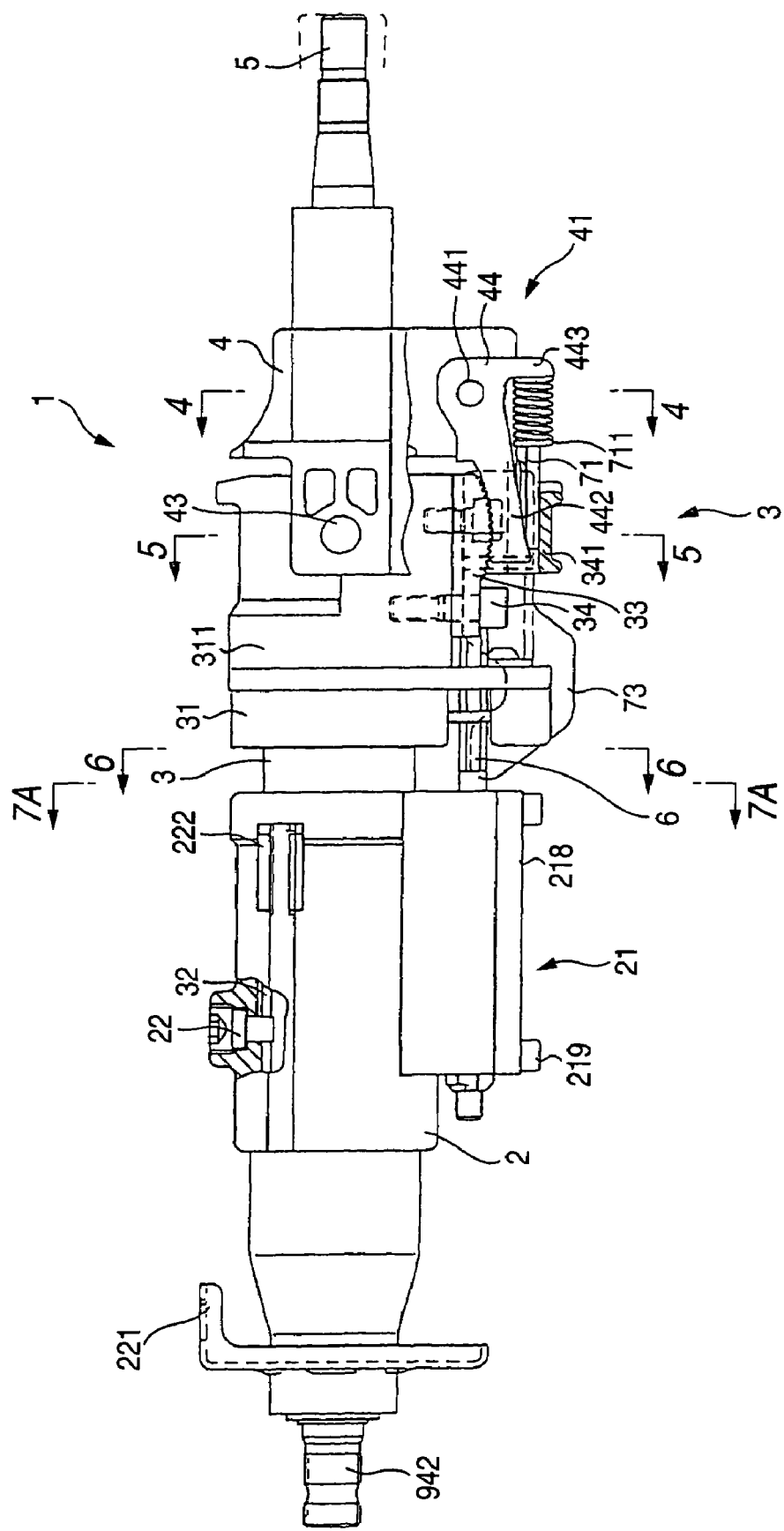
FIG. 2 is a partly enlarged cutaway view of a principle portion shown in FIG. 1, showing the steering column 1.
Figure 3:
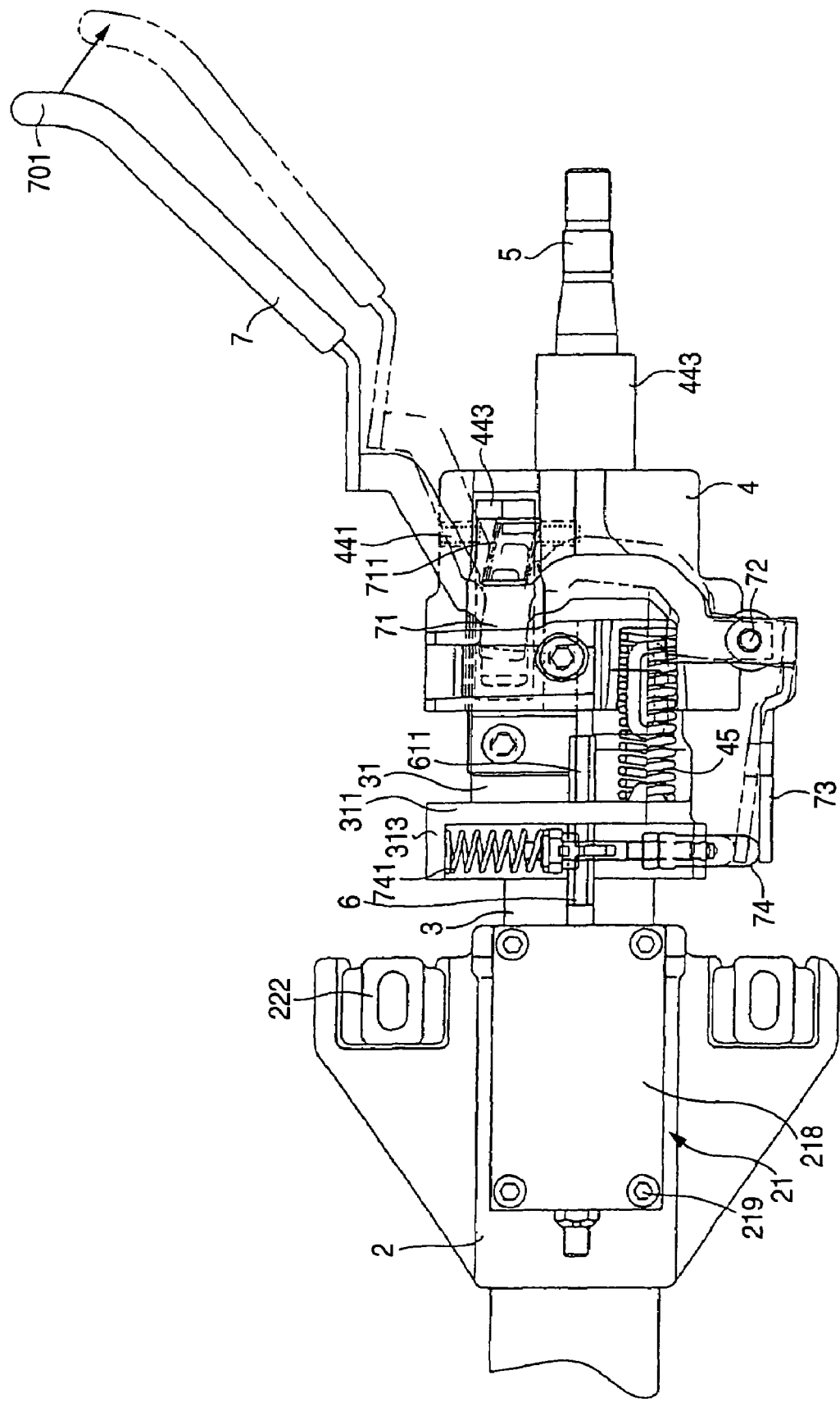
FIG. 3 is a bottom view of the steering column 1 as viewed from below (from the direction Q) in FIG. 2.
Figure 4:
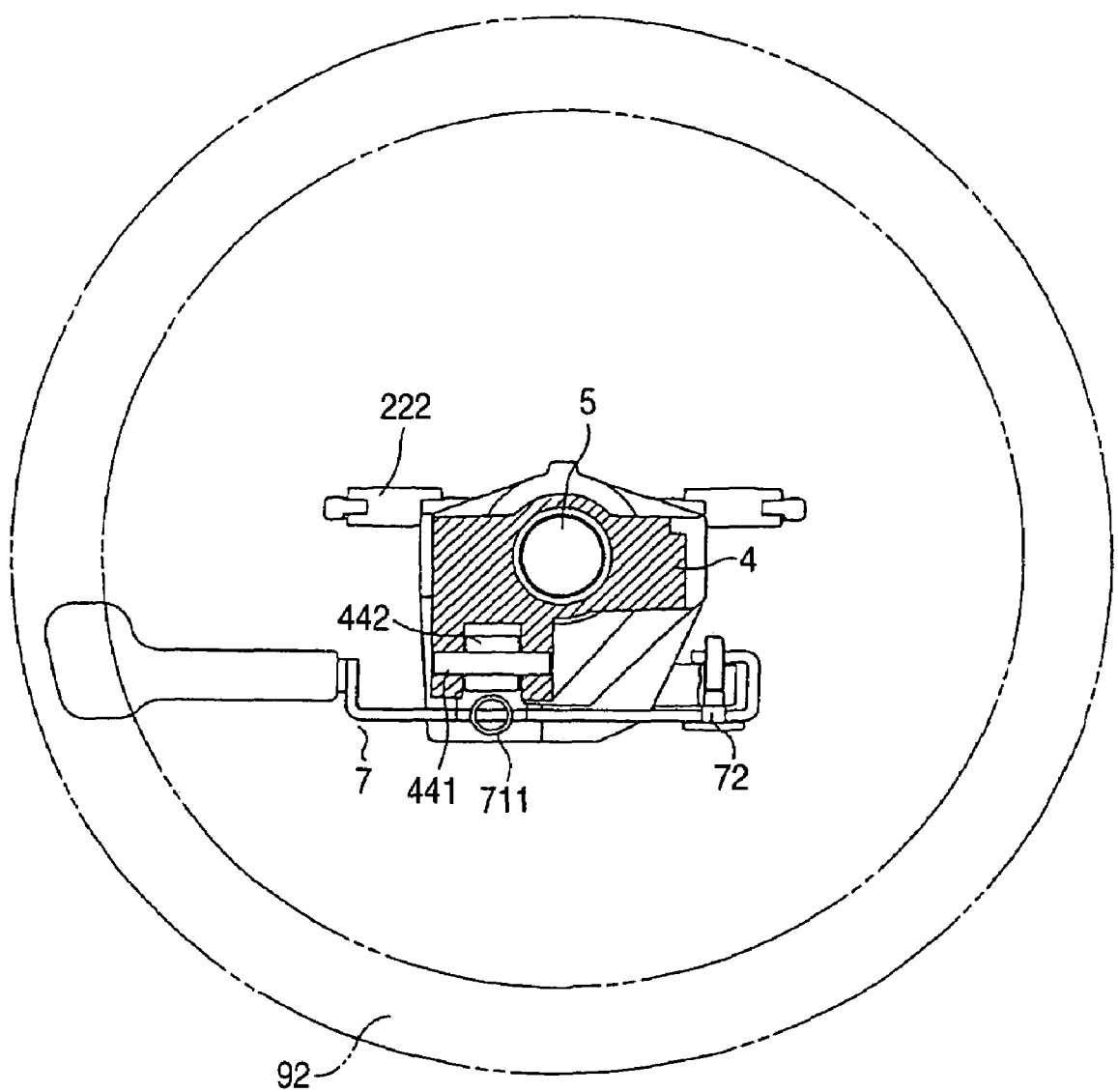
FIG. 4 is cross-sectional view taken along line 4-4 in FIG. 2.
Figure 5:
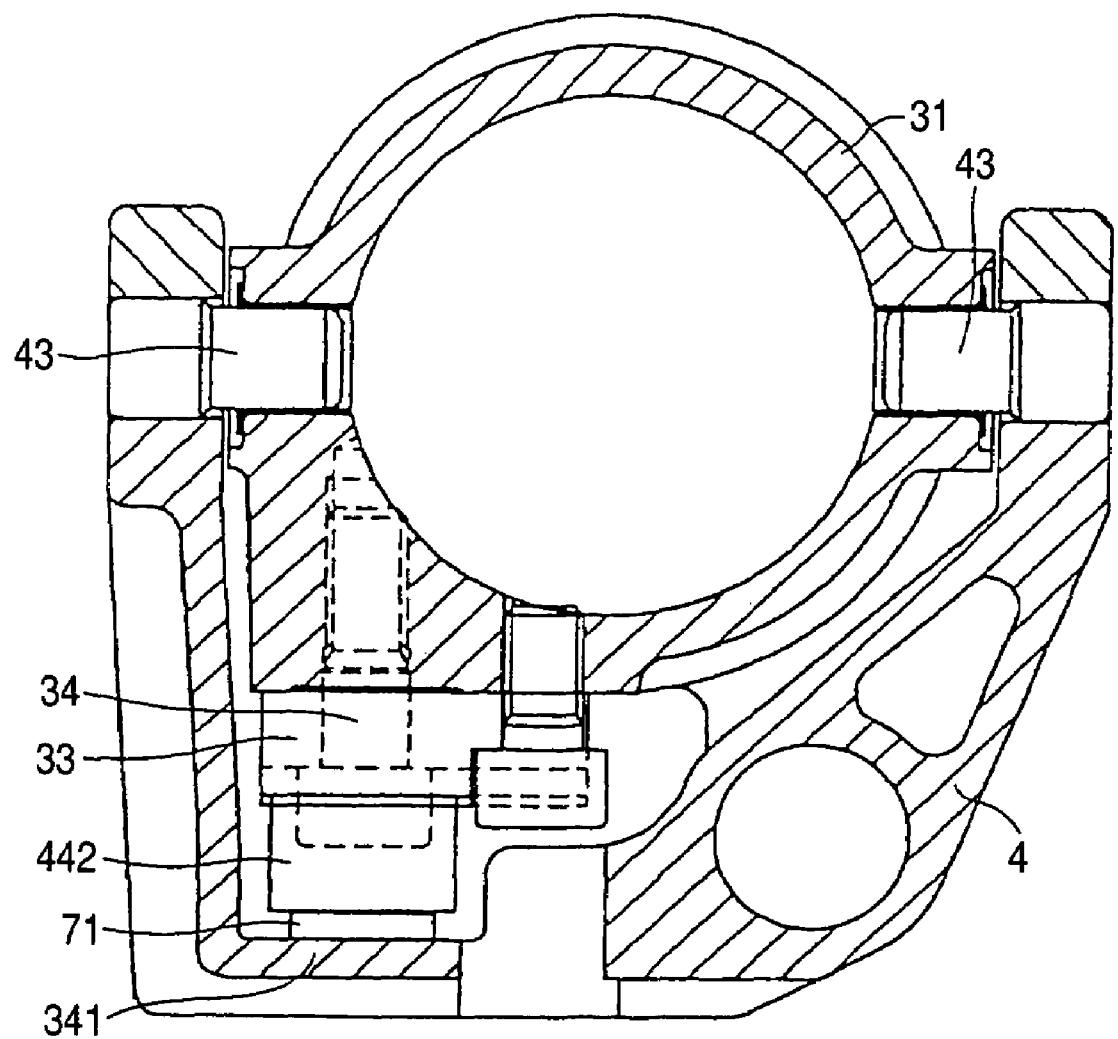
FIG. 5 is a cross-sectional view taken along line 5-5 in FIG. 2.
Figure 6:
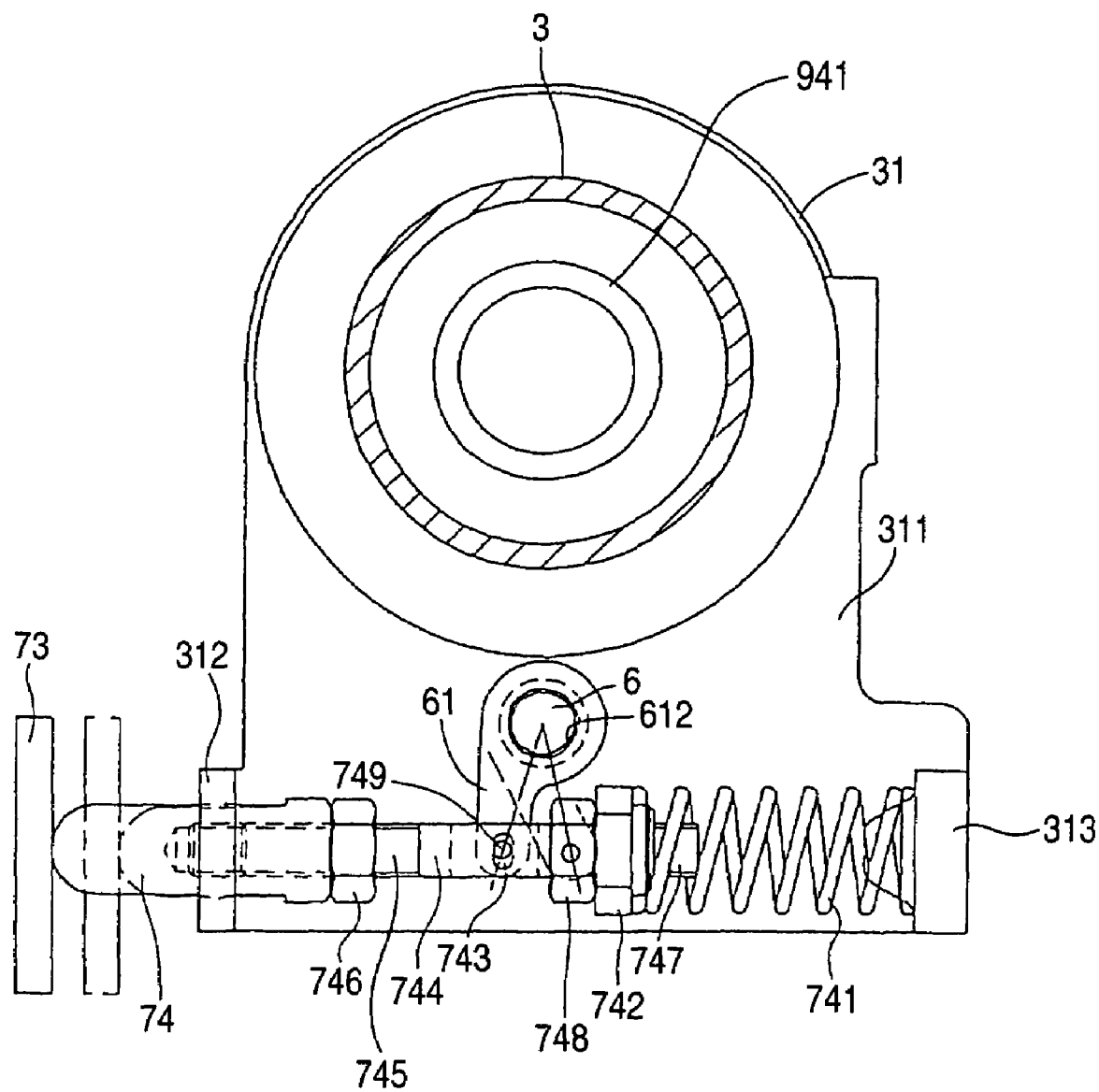
FIG. 6 is cross-sectional view taken along line 6-6 in FIG. 2.

FIG. 2 is a partly enlarged cutaway view of a principle portion of FIG. 1, showing the steering column 1. FIG. 3 is a bottom view of the steering column 1 as viewed from below (from the direction 3) in FIG. 2. FIG. 4 is sectional view taken along line 4-4 in FIG. 2. FIG. 5 is a sectional view taken along line 5-5 in FIG. 2. FIG. 6 is sectional view taken along line 6-6 in FIG. 2.

The tilt head clamp 41 is configured as follows. A segment gear 33 (FIG. 2) centered on the TILT CENTER AXIS 43 is fixed on the movable column member 3 by means of a bolt 34. A backing member 341 is disposed in such a manner as to be spaced apart from the segment gear 33. Meanwhile, in the space between the backing member 341 and the segment gear 33, there are interposed a gear section 442 of a gear arm 44, which is rotatably supported on the tilt head 4 about a shaft 441, and a projecting portion 71 disposed on the control lever 7.

The gear arm 44 is formed into a L-shape having two legs, and the gear section 442 is disposed on one of the legs. A spring 711 is interposed between the other leg 443 of the gear arm 44 and a back portion of the projecting portion 71, thereby applying a bias to widen a gap between the back portion of the projecting portion 71 and the leg 443.

The bias pushes the projecting portion 71 to the left, to thus push the gear section 442 from behind. Consequently, the gear section 442 is pressed against the segment gear 33, thereby attaining mutual engagement between teeth of the gear section 442 and teeth of the segment gear 33. When the gear section 442 is pressed against the segment gear 33, a reactive force applied on the projecting portion 71 is received by the backing member 341 (FIGS. 2 and 5), whereby the tilt head 4 is held in place. Specifically, the tilt head 4 is retained in stepped positions at an angle where the gear section 442 and the segment gear 33 can engage.

When the projecting portion 71 of the control lever 7 moves rightward in FIG. 2, the gear arm 44 is rotated counterclockwise in FIG. 2 by the pressing force of the spring 711, thereby disengaging the teeth of these gears. Therefore, during adjustment of the tilt angle (at this time, the axial position is also adjustable, by means of telescoping motion), the projecting portion 71 is allowed to move rightward by the operation of the control lever 7.

Universal Joint and Intermediate Shaft

An unillustrated upper universal joint is disposed between an end portion of the upper intermediate shaft 941 and an end portion of the wheel shaft 5 shown in FIG. 6. The upper universal joint is centered on the TILT CENTER AXIS 43. Accordingly, the upper universal joint is not affected by tilting of the tilt head 4.

The lower intermediate shaft 942 is rotatably supported on the stationary column member 2. Since the lower intermediate shaft 942 and the upper intermediate shaft 941 are spline-engaged, the movable column member 3 can be moved in the horizontal direction in FIG. 2. The spline engagement enables the rotation of the upper intermediate shaft 941 to be transmitted to the lower intermediate shaft 942, irrespective of a position to which the movable column member 3 is moved (hereinafter referred to as "moved position"). Accordingly, the rotation of the steering wheel 92 can be transmitted to the lower intermediate shaft 942 even when the height of the steering wheel 92 is adjusted.

Stationary Column Member and Movable Column Member

As shown in FIG. 2, an elongated hole 32, which is elongated along an axial direction, is formed on the cylindrical portion of the movable column member 3. A stopper member 22, which is disposed on the stationary column member 2, is engaged in the elongated hole 32. The elongated hole 32 and the stopper member 22 prevent the movable column member 3 from coming off the stationary column member 2 and from rotating in relation to the stationary column member 2. Accordingly, the movable column member 3 is allowed to move in the stationary column member 2 in the axial direction within the range of the elongated hole 32. The outer surface of the cylindrical portion of the movable column member 3 is guided by a sliding guide hole 232 (FIG. 7) of the stationary column member 2, and allowed to move in the axial direction of the movable column member 3 without play.

Control Lever and Interlinking Operation

Next, respective members which are interlinked with operations of the control lever 7 will be described. The control lever 7 is disposed below the steering column 1. FIGS. 3 and 4 show the control lever 7, a lever center axis 72 which acts as a center of swaying motion of the control lever 7, a pusher plate 73 fixed on the control lever 7, and a pusher rod 74. FIG. 3 shows the entire control lever 7 in an non-operated state by means of a solid line, and in a state where the control lever 7 is operated for adjusting a height and a tilt angle (i.e., a state where an end portion 701 of the control lever 7 (hereinafter referred to as "control lever end 701") of the control lever 7 is pulled toward the steering wheel 92) by means of a dot-dash line.

As shown in FIG. 6, the pusher rod 74 is supported on a rib 312 on the lower left side of the of a bracket 311 extending downward from the column head 31 slidably in parallel to the TILT CENTER AXIS 43. A left-side threaded portion 745 of a bolt 744 is inserted in the right end of the pusher rod 74, and its screwing length is adjusted. After the adjustment, the threaded portion 745 is fixed by a nut 746. A collar 742 is fitted over a right-side threaded portion 747 of the bolt 744. A nut 748 which is screwed onto the threaded portion 747 positions the collar 742 in the horizontal direction.

A compression spring 741 for applying leftward force on the bolt 744 in FIG. 6 is interposed between a rib 313 formed on the right side of the lower end of the bracket 311 and the collar 742. An elongated hole 743 which is of small diameter and elongated in the left direction is disposed on the intermediate point of the bolt 744. The bolt 744 is engaged with one end of a swaying arm 61 by means of a pin 749, with the elongated hole 743 disposed between the bolt 744 and the one end of the swaying arm 61. The elongated hole 743 functions to absorb the deviation in a positional relation between the pusher rod 74 and the bolt 744, and the swaying arm 61 when the pusher rod 74 and the bolt 744 move in an axial direction.

As the spring 741 applies leftward force on the pusher rod 744, the tip on the left-side of the pusher rod 74 is caused to constantly contact the pusher plate 73, and a clockwise rotational force is applied on the swaying arm 61 which is engaged with the bolt 744 by means of the pin 749. A swaying force applied on the swaying arm 61 holds the column clamp shaft 6 at a clamping position. A solid line indicates the swaying arm 61 in the above state.

The column clamp shaft 6 has a portion which is shaped into a polygonal cross-section axis 611 (hereinafter referred to as "polygonal cross-section axis 611") (FIG. 3) extending through the bracket 311 toward the column head 31. The polygonal cross-section axis 611 is formed so as to be longer than a movable length of the movable column member 3 in the axial direction. The polygonal cross-section axis 611 of the column clamp shaft 6 passes through a polygonal cross-section hole 612 of the swaying arm 61. Therefore, irrespective of the position of the movable column member 3 within the movable range, rotation of the swaying arm 61 can be transmitted to the column clamp shaft 6.

Pusher Plate

The tilt head 4 tilts on the column head 31. Therefore, the positional relation between the pusher rod 74 and the pusher plate 73 varies in accordance with the amount of tilt (angle). The dot-dashlines and the solid line in FIG. 1 show orientations of the tilt head 4 when it is tilted at different angles. The position of the pusher rod 74, which is supported on the column head 31, is not changed by tilting. However, since the pusher rod 73 is distant from the TILT CENTER AXIS 43, a relative position of the pusher plate 73 with respect to the pusher rod 74 is changed when the tilt head 4 is tilted. Therefore, the pusher plate 73 is provided with a wide contact face which is bent to resemble a hockey stick so that the pusher rod 74 contacts the pusher plate 73 at an arbitrary angle.

Column Clamp

Figure 7A:
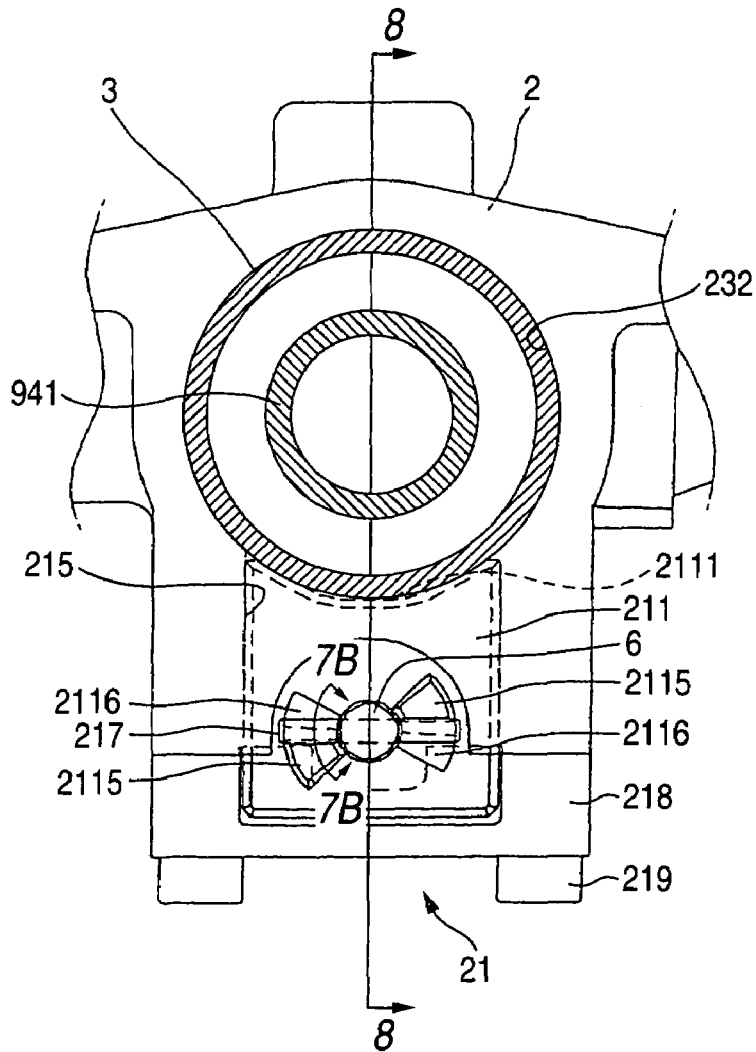
FIG. 7A is a cross-sectional view taken along line 7A-7A in FIG. 2.
Figure 7B:
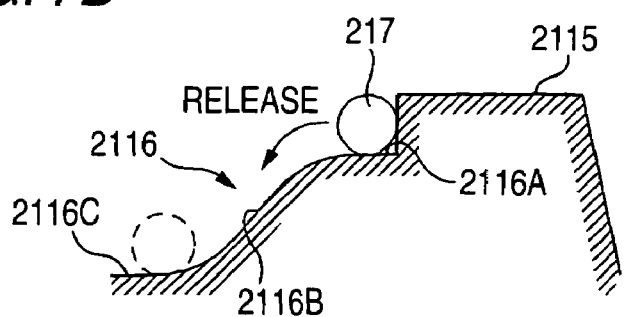
FIG. 7B is a cross sectional view taken along line 7B-7B in FIG. 7A.
Figure 8:
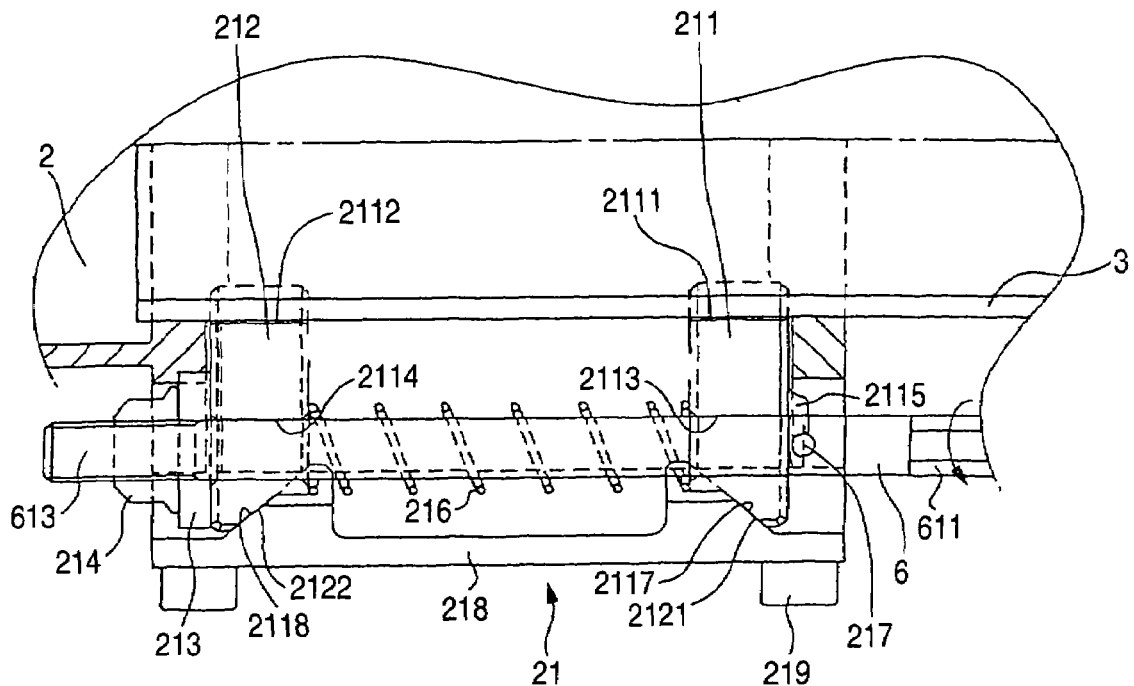
FIG. 8 is a cross-sectional view taken along line 8-8 in FIG. 7A.

A configuration of the column clamp 21 will be described with reference to FIGS. 7A, 7B, and 8. FIG. 7A is a cross sectional view taken along line 7A-7A in FIG. 2. FIG. 7B is a cross sectional view taken along line 7B-7B in FIG. 7A. FIG. 8 is a cross sectional view taken along line 8-8 in FIG. 7A. The column clamp 21 is disposed on the stationary column member 2, and configured by assembling the column clamp shaft 6, a pin 217, a first wedge 211, a tension spring 741, a second wedge 212, a thrust bearing 213, and a nut 214, in the order given from the right-hand side of FIG. 8. A wedge hole 215 is bored in the stationary column member 2 from below. The upper portion of the wedge hole 215 is opened to the sliding guide hole 232 which is formed on the stationary column member 2 for guiding the movable column member 3 in the axial direction.

The lower portion of the wedge hole 215 is sealed by a cover 218 which is fixed on the stationary column member 2 by means of four bolts 219. The first wedge 211 and the second wedge 212 are inserted within the wedge hole 215 slidably in the vertical and horizontal direction in FIG. 8.

Clamping surfaces 2111, 2112 which are substantially of a V-shape and are opposed to the movable column member 32 are disposed on the upper portions of the first wedge 211 and the second wedge 212. The clamping surfaces 2111, 2112 are opposed to the outer surface of the cylindrical portion of the movable column member 3, and contact the outer surface of the cylindrical portion of the movable column member 3 at two points spaced in the circumferential direction of the movable column member 3 at the time of clamping of the movable column member 3. Accordingly, the movable column member 3 is clamped in relation to the stationary column member 2.

The first wedge 211 and the second wedge 212 are disposed at positions spaced along the axis of the stationary column clamp 2. A clamp shaft hole 2113 is bored in the first wedge 211, and a clamp shaft hole 2114 is bored in the second wedge 212. The column clamp shaft 6 passes through the holes 2113, 2114. The nut 214 is screwed onto a thread 613 formed on the left end of the column clamp shaft 6. The nut 214 presses the thrust bearing 213 so as to bring the same into contact with the second wedge 212.

The tension spring 741 is fitted over the column clamp shaft 6 between the first wedge 211 and the second wedge 212, thereby constantly applying force on the first wedge 211 and the second wedge 212 in a direction urging the two wedges apart. Two pairs each consisting of a sector stopper 2115 and a sector cam face 2116 are disposed symmetrically about the clamp shaft hole 2113 on the right end face of the first wedge 211; and the pin 217 fixed on the column clamp shaft 6 contacts the sector cam faces 2116, 2116 constantly, to thus configure a cam mechanism.

Tilt faces 2117, 2118 which tilt down axially outward are formed on the cover 218. A tilt face 2121 formed on the lower end of the first wedge 211 contacts the tilt face 2117, and a tilt face 2122 formed on the lower end of the second wedge 212 contacts the tilt face 2118. As described above, the column clamp shaft 6 is rotated as a result of swaying motion of the swaying arm 61.

When a swaying rotation (swaying rotation of clockwise in FIG. 6; note that FIGS. 6 and 7A differ in direction and are bilaterally symmetrical) is applied on the swaying arm 61 so as to bring the same from an unclamped state to the clamped state shown in FIGS. 7A, 7B, and 8, the column clamp shaft 6, the nut 214, and the thrust bearing 213 are rotated counterclockwise in FIG. 7A. On the sector cam face 2116, the pin 217 moves on a valley 2116C and a tilt face 2116B; proceeds up on a peak 2116A; contacts a sector stopper 2115 and stops; and pulls the column clamp shaft 6 rightward. Accordingly, the second wedge 212 is pushed rightward by the thrust bearing 213, and the first wedge 211 is pushed leftward by the pin 217, whereby a gap between the two wedges is narrowed.

Consequently, the respective tilt faces 2121, 2122 move along the tilt faces 2117, 2118 of the cover 218; and the first wedge 211 and the second wedge 212 ascend. Accordingly, the clamping surface 2111 of the first wedge 211 and the clamping surface 2112 of the second wedge 212 press the outer surface of the cylindrical portion of the movable column member 3, whereby the movable column member 3 is clamped at two points which are axially spaced in relation to the stationary column member 2.

As described above, the movable column member is clamped in relation to the stationary column member at two or more points which are spaced along the center axis of the movable column member. Therefore, clamping rigidity is high, and the movable column member is not loosened in relation to the stationary column member when subjected to vibrations or the like. Furthermore, the cam mechanism—formed from the pin 217, the sector stopper 2115, and the sector cam face 2116—can obtain a large travel stroke in the axial direction of the column clamp shaft 6 as a result of a small rotation angle of the column clamp shaft 6. Accordingly, an operating angle of the control lever 7 can be narrowed.

Furthermore, a phase relation during clamping/unclamping of the cam mechanism formed from the pin 217, the sector stopper 2115, and the sector cam face 2116 is easily viewed. Therefore, phase adjustment can be easily performed during assembly of the cam mechanism. Additionally, adjustment of a column clamping force for compensating dimensional errors of components such as the first wedge 211, the second wedge 212, and the cover 218 can be performed easily by means of control of tightening torque of the nut 214.

When a swaying rotation (swaying rotation in the counterclockwise direction in FIG. 6) is applied on the swaying arm 61 from the clamped state shown in FIGS. 7A, 7B, and 8, the column clamp shaft 6 is rotated clockwise in FIG. 7A. On the sector cam face 2116, the pin 217 moves from the peak 2116A to the tilt face 2116B, and reaches the valley 2116C side. Accordingly, the first wedge 211 and the second wedge 212 are forcibly separated by the restoration force of the tension spring 741; the first wedge 211 and the second wedge 212 descend; and the clamping surfaces 2111, 2112 are separated from the outer surface of a column member 3, whereby clamping of the movable column member 3 is released. As described above, the clamping is forcibly released by the restoration force of the tension spring 741. Therefore, release of clamping can be performed reliably.

Alternate Embodiment of Wedge actuation mechanism

Figure 9:
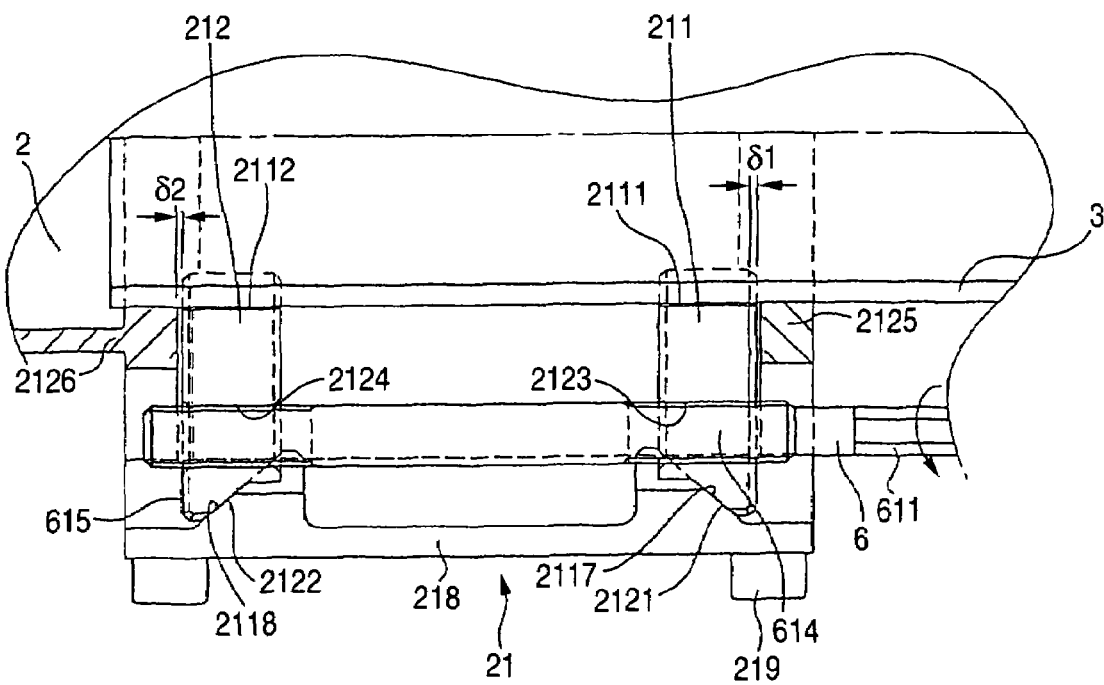
FIG. 9 is a cross-sectional view showing a wedge actuation mechanism of double thread type.

FIG. 9 is a cross sectional view showing a mechanism for actuating a wedges by means of reverse double threads. In FIG. 9, components identical with those in FIG. 8 are denoted by the same reference numerals, and their repeated descriptions are omitted. An right male thread 614 formed on the column clamp shaft 6 is screwed into an right female thread 2123 formed in the first wedge 211. A left male thread 615 formed on the column clamp shaft 6 is screwed into a left female thread 2124 formed in the second wedge 212.

When the column clamp shaft 6 is rotated counterclockwise as indicated by an arrow in FIG. 9, the first wedge 211 and the second wedge 212 move in a direction for narrowing the gap between the same. The respective tilt faces 2121, 2122 move along the tilt faces 2117, 2118 of the cover 218; whereby the first wedge 211 and the second wedge 212 ascend, and the clamping surface 2111 of the first wedge 211 and the clamping surface 2112 of the second wedge 212 press the outer surface of the cylindrical portion of the movable column member 3. Accordingly, the movable column member 3 is clamped at two points which are axially spaced in relation to the stationary column member 2.

When the column clamp shaft 6 is rotated clockwise in FIG. 9, the first wedge 211 and the second wedge 212 descend while moving in a direction for widening the gap between the same. Accordingly, the clamping surfaces 2111, 2112 are separated from the outer surface of the movable column member 3, whereby clamping of the movable column member 3 is released.

When a gap δ1 between a right end face of the first wedge 211 and the left end face of a front wall 2125 of the stationary column member 2 and a gap δ2 between a left end face of the second wedge 212 and the right end face of a back wall 2126 of the stationary column member 2 are set to appropriate values, for instance, even when the clamping surface 2111 of the first wedge 211 bites into the movable column member 3 and prevents unclamping, by virtue of a reactive force of a contact of the left end face of the second wedge 212 and the right end face of the back wall 2126 of the stationary column member 2, a force acts in a direction for displacing the first wedge 211 rightward. Accordingly, biting of the first wedge 211 is released.

Figure 10:
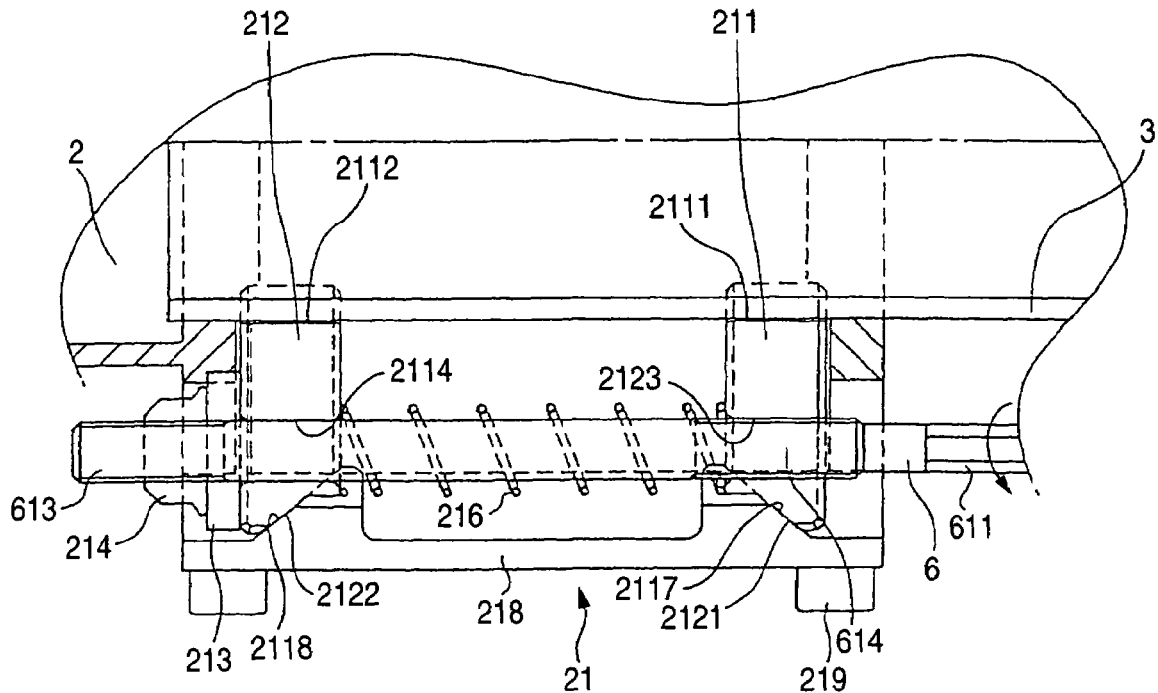
FIG. 10 is a cross-sectional view showing a wedge actuation mechanism of single thread type.

FIG. 10 is a cross sectional view showing a mechanism for actuating a wedge by means of a single thread mechanism. In FIG. 10, components identical with those in FIGS. 8 and 9 are denoted by the same reference numerals, and their repeated descriptions are omitted. In the configuration of FIG. 8, the wedges are moved by contact between the pin 217 with a sector protruding face 2115 and a sector concave face 2116. Meanwhile, FIG. 10 differs from FIG. 8 in that the right male thread 614 formed on the column clamp shaft 6 is screwed into the right female thread 2123 formed in the first wedge 211, and other configurations are identical with those of the embodiment of FIG. 8.

When the column clamp shaft 6 is rotated counterclockwise as indicated by an arrow in FIG. 10, the nut 214 and the thrust bearing 213 are rotated counterclockwise; the first wedge 211 is pushed leftward by relative rotation between the right male thread 614 and the right female thread 2123; by a reactive force thereof, the second wedge 212 is pushed rightward by the thrust bearing 213; and the two wedges move in a direction for narrowing the gap between the same. Accordingly, the respective tilt faces 2121, 2122 are moved along the tilt faces 2117, 2118; whereby the first wedge 211 and the second wedge 212 ascend, and the clamping surface 2111 of the first wedge 211 and the clamping surface 2112 of the second wedge 212 press the outer surface of the cylindrical portion of the movable column member 3. Accordingly, the movable column member 3 is clamped at two points which are axially spaced in relation to the stationary column member 2.

When the column clamp shaft 6 is rotated clockwise in FIG. 10, the first wedge 211 descends while moving rightward, and the second wedge 212 descends while moving leftward by the restoration force of the tension spring 741. Accordingly, the clamping surfaces 2111, 2112 are separated from the outer surface of a column member 3, whereby clamping of the movable column member 3 is released.

Figure 11:
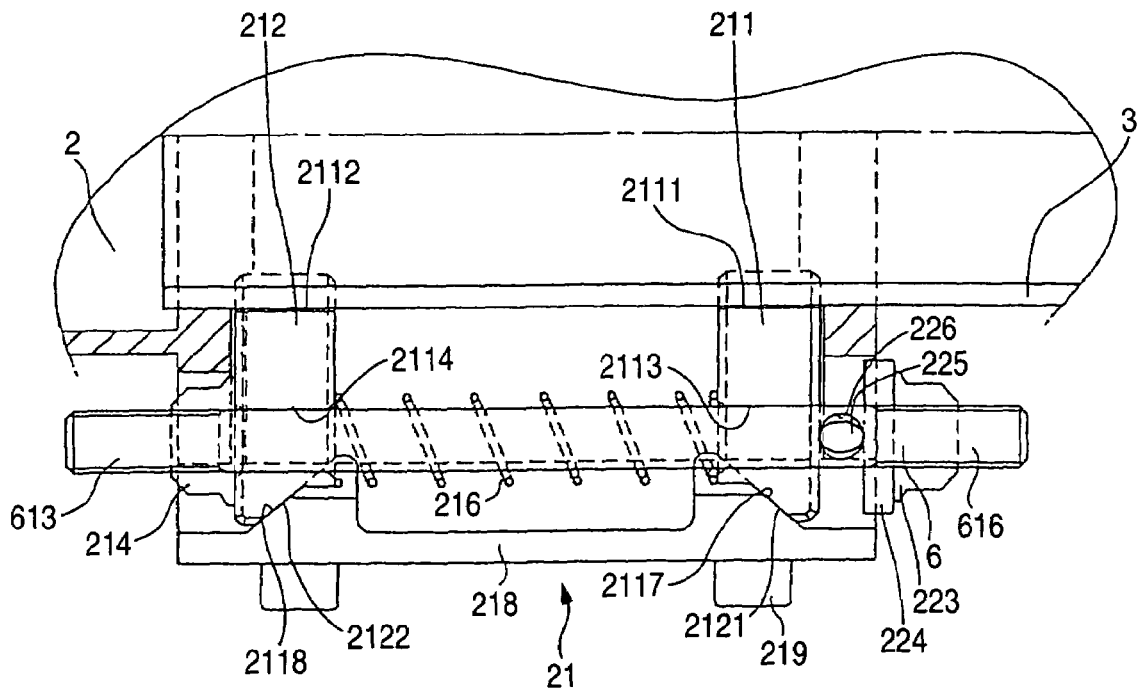
FIG. 11 is across-sectional view showing a wedge actuation mechanism of elliptical cam bar type.

FIG. 11 is a cross sectional view of a mechanism for actuating a wedge by means of an elliptical cam bar mechanism. In FIG. 11, components identical with those in FIG. 8 are denoted by the same reference numerals, and their repeated descriptions are omitted. In the column clamp 21 of FIG. 11, the column clamp shaft 6, a nut 223, a collar 224, an elliptical cam bar 225, the first wedge 211, the tension spring 741, the second wedge 212, and the nut 214 are assembled, in the order given from the right-hand side.

The first wedge 211 and the second wedge 212 are disposed at positions spaced along the axis of the stationary column clamp 2. The clamp shaft hole 2113 is bored in the first wedge 211, and the clamp shaft hole 2114 is bored in the second wedge 212. The column clamp shaft 6 passes through the clamp shaft holes 2113 and 2114. The nut 214 is screwed onto the thread 613 formed on the left end of the column clamp shaft 6. The nut 214 contacts the second wedge 212. The tension spring 741 is fitted over the column clamp shaft 6 between the first wedge 211 and the second wedge 212, thereby constantly applying force on the first wedge 211 and the second wedge 212 in a direction urging the two wedges apart.

The nut 223 is screwed onto the threaded portion 616 formed on the right end of the column clamp shaft 6. The nut 223 contacts a right end face of the collar 224. A through hole 226 is bored in the column clamp shaft 6 in such a manner as to contact a left end face of the collar 224 in a direction orthogonal to the plane of the drawing. The elliptical cam bar 225 is rotatably inserted in the through hole 226 from a direction orthogonal to the plane of the drawing.

When the movable column member 3 is clamped as shown in FIG. 11, the major axis of the elliptical cam bar 225 is aligned with the axial direction of the clamp shaft 6. As a result, one of end portions of the ellipse along the major axis (hereinafter referred to as "major axial elliptic portions") of the elliptical cam bar 225 presses the collar 224 rightward, and the other one of the major axial elliptic portions presses the first wedge 211 leftward, whereby the column clamp shaft 6 is pulled rightward.

Consequently, the gap between the two wedges is narrowed, and the respective tilt faces 2121, 2122 are moved along the tilt faces 2117, 2118 of the cover 218. Accordingly, the first wedge 211 and the second wedge 212 ascend, and the clamping surface 2111 of the first wedge 211 and the clamping surface 2112 of the second wedge 212 press the outer surface of the cylindrical portion of the movable column member 3, whereby the movable column member 3 is clamped at two points which are axially spaced in relation to the stationary column member 2.

When the elliptical cam bar 225 is rotated and the major axis of the elliptical cam bar 225 is tilted in relation to the axial direction of the column clamp shaft 6, the first wedge 211 and the second wedge 212 descend in a direction for widening the gap between the first wedge and the second wedge by the restoration force of the tension spring 741. Accordingly, the clamping surfaces 2111, 2112 are separated from the outer surface of the column member 3, whereby clamping of the movable column member 3 is released.

Alternate Embodiments of Wedge Arrangement

FIGS. 12A through 12F are conceptual views showing alternate embodiments of arrangements of the wedges.

Figure 12A:
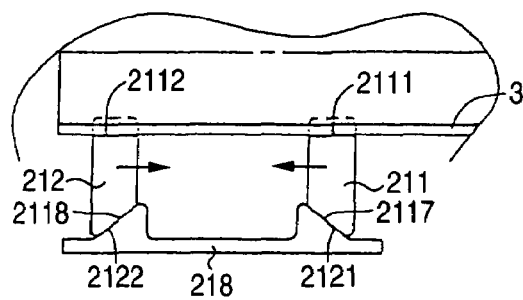
FIGS. 12A to 12F are conceptual views showing various arrangement examples of wedges.

FIG. 12A show an arrangement of the wedges indicated in the aforementioned FIGS. 8 to 11, wherein the tilt faces 2117, 2118 which descend axially outward are formed on the cover 218. The tilt face 2121 formed on the inner lower end of the first wedge 211 contacts the tilt face 2117, and the tilt face 2122 formed on the inner lower end of the second wedge 212 contacts the tilt face 2118.

When the two wedges are moved in a direction for narrowing the gap between the two wedges as indicated by arrows, the first wedge 211 and the second wedge 212 ascend, and the clamping surface 2111 of the first wedge 211 and the clamping surface 2112 of the second wedge 212 press the outer surface of the cylindrical portion of the movable column member 3. Consequently, the movable column member 3 is clamped at two points which are axially spaced in relation to the stationary column member 2.

Figure 12B:
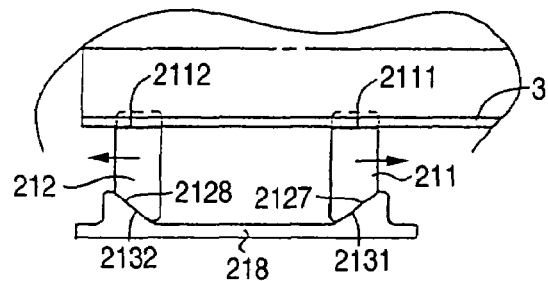

In FIG. 12B, tilt faces 2127, 2128 which tilt down in an axially inward direction are formed on the cover 218. A tilt face 2131 formed on the outer lower end of the first wedge 211 contacts the tilt face 2127, and a tilt face 2132 formed on the outer lower end of the second wedge 212 contacts the tilt face 2128.

When the two wedges are moved in a direction for widening the gap between the two wedges as indicated by arrows, the first wedge 211 and the second wedge 212 ascend, and the clamping surface 2111 of the first wedge 211 and the clamping surface 2112 of the second wedge 212 press the outer surface of the cylindrical portion of the movable column member 3. Consequently, the movable column member 3 is clamped at two points which are axially spaced in relation to the stationary column member 2.

Figure 12C:
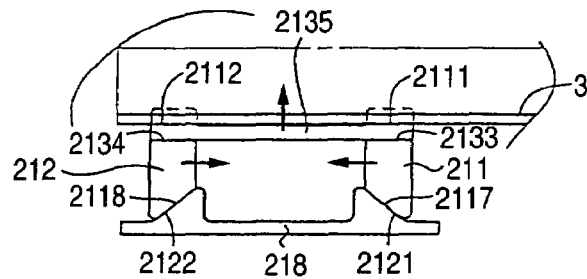

In FIG. 12C, shapes of the tilt faces 2117, 2118 of the cover 218, the tilt face 2121 of first wedge 211, and the tilt face 2122 of the second wedge 212 are identical with those in FIG. 12A; however, they are different in that a flat face 2133 is formed on the upper end of the first wedge 211, and a flat face 2134 is formed on the upper end of the second wedge 212; and the flat faces 2133, 2134 contact a bottom face of a press plate 2135 having substantially the same length as the gap between the first wedge 211 and the second wedge 212 with respect to an axial direction.

The clamping surfaces 2111, 2112 of a substantially V-shape are formed on the top face of the press plate 2135. The clamping surfaces 2111, 2112 clamp the outer surface of the cylindrical portion of the movable column member 3. When the two wedges are moved in a direction for narrowing the gap between the two wedges as indicated by arrows, the first wedge 211 and the second wedge 212 ascend. Accordingly, the press plate 2135 is pressed upward in a direction indicated by an arrow, and the clamping surfaces 2111 and 2112 on the upper end of the press plate 2135 press the outer surface of the cylindrical portion of the movable column member 3. Consequently, the movable column member 3 is clamped at two points which are axially spaced in relation to the stationary column member 2.

When the movable column member 3 is clamped while sandwiching the press plate 2135 of low profile, biting will not occur between the movable column member 3 and the clamping surfaces 2111, 2112 on the press plate 2135, thereby enabling stable clamping/unclamping operations.

Figure 12D:
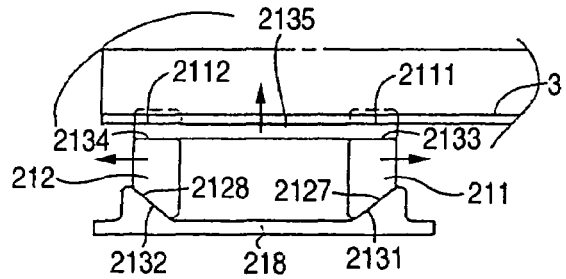

In FIG. 12D, shapes of tilt faces 2127, 2128 of the cover 218, the tilt face 2131 of first wedge 211, and the tilt face 2132 of the second wedge 212 are identical with those in FIG. 12B; however, they are different in that the flat face 2133 is formed on the upper end of the first wedge 211, and the flat face 2134 is formed on the upper end of the second wedge 212; and the flat faces 2133, 2134 contact the bottom face of the press plate 2135 having substantially the same length as the gap between the first wedge 211 and the second wedge 212 with respect to an axial direction.

The clamping surfaces 2111, 2112 of a substantially V-shape are formed on the top face of the press plate 2135. The clamping surfaces 2111, 2112 clamp the outer surface of the cylindrical portion of the movable column member 3. When the two wedges are moved in a direction for widening the gap between the two wedges as indicated by arrows, the first wedge 211 and the second wedge 212 ascend. Accordingly, the press plate 2135 is pressed upward in a direction indicated by an arrow, and the clamping surfaces 2111 and 2112 on the upper end of the press plate 2135 press the outer surface of the cylindrical portion of the movable column member 3. Consequently, the movable column member 3 is clamped at two points which are axially spaced in relation to the stationary column member 2.

Figure 12E:
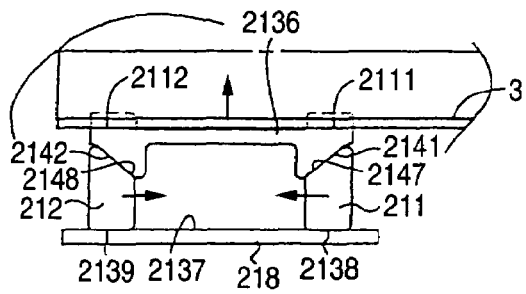

FIG. 12E is identical with FIGS. 12C and 12D in that the clamping surfaces 2111, 2112 of a substantially V-shape on the top face of a press plate 2136 clamp the outer surface of the cylindrical portion of the movable column member 3; however, tilt faces are not formed between the cover 218, and the first wedge 211 and the second wedge 212 in FIG. 12E. In other words, a flat face 2137 is formed on the top face of the cover 218, a flat face 2138 is formed on the bottom face of the first wedge 211, and a flat face 2139 is formed on the bottom face of the second wedge 212.

Tilt faces 2141, 2142 which tilt upward in a axially outward direction are formed on the bottom face of a press plate 2136. A tilt face 2147 formed on the inner upper end of the first wedge 211 constantly contacts the tilt face 2141, and a tilt face 2148 formed on the inner upper end of the second wedge 212 constantly contacts the tilt face 2142.

When the two wedges are moved in a direction for narrowing the gap between the two wedges as indicated by arrows, the first wedge 211 and the second wedge 212 push the press plate 2136 upward in a direction indicated by an arrow in the drawing by wedging actions of the tilt faces 2147, 2148 and tilt faces 2141, 2142; and the clamping surfaces 2111 and 2112 on the upper end of the press plate 2136 press the outer surface of the cylindrical portion of the movable column member 3. Consequently, the movable column member 3 is clamped at two points which are axially spaced in relation to the stationary column member 2.

Figure 12F:
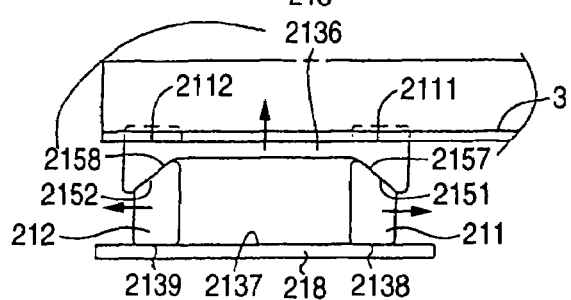

FIG. 12F differs from FIG. 12E in tilting directions of tilt faces. Tilt faces 2151, 2152 which tilt downward in an axially outward direction are formed on the, bottom face of the press plate 2136. A tilt face 2157 formed on the upper end of the first wedge 211 constantly contacts the tilt face 2151, and a tilt face 2158 formed on the upper end of the second wedge 212 constantly contacts the tilt face 2152.

When the two wedges are moved in a direction for widening the gap between the two wedges as indicated by arrows, the first wedge 211 and the second wedge 212 push the press plate 2157 upward in a direction indicated by an arrow in the drawing by wedging actions of the tilt faces 2157, 2158 and tilt faces 2151, 2152; and the clamping surfaces 2111 and 2112 on the upper end of the press plate 2136 press the outer surface of the cylindrical portion of the movable column member 3. Consequently, the movable column member 3 is clamped at two points which are axially spaced in relation to the stationary column member 2.

Adjustment of Steering Wheel

Operations for adjusting the height and tilt angle of the Steering wheel 92 and actions of the respective members will be described below. A driver pulls the control lever 7 without releasing his hand (thumb) from the steering wheel 92, e.g., by extending all the fingers except the thumb. As a result, the control lever 7 sways about the lever center axis 72 as shown in FIG. 3.

When the control lever 7 is swayed, the projecting portion 71 moves rightward in FIG. 2, thereby rotating the gear arm 44 counterclockwise. When the gear arm 44 is rotated, teeth of the segment gear 33 and teeth of the gear section 442 of the gear arm 44 are disengaged, whereby the tilt head 4 is allowed to tilt (FIG. 2).

Simultaneously, swaying motion of the control lever 7 sways the pusher plate (73 FIG. 3), whereby the pusher plate 73 overcomes the restoration force of the spring 741, and pushes the pusher rod 74 upward in the drawing (FIG. 3). The above-mentioned motion corresponds to a rightward motion of the pusher rod 74 in FIG. 6.

The rightward motion of the pusher rod 74 causes the swaying arm 61 to sway counterclockwise, thereby causing the column clamp shaft 6 to rotate clockwise in FIG. 7A. When the column clamp shaft rotates, the pin 217 moves from the valley 2116C to the peak 2116A side via the tilt face 2116B of the sector cam face 2116. Accordingly, the gap between the first wedge 211 and the second wedge 212 is widened by the restoration force of the tension spring 741, whereby clamping of the movable column member 3 is released.

As described above, the tilt head 4 is allowed to tilt; and the column head 31 is allowed to move in the heightwise direction. Accordingly, the driver can adjust the heightwise position and the tilt angle of the steering wheel 92 without releasing his hand from the steering wheel 92 and the control lever 7. When the tilt head clamp 41 is released, a downward force is applied on the tilt head 4 due to its own weight in a manner of a man hanging his head down.

To counterbalance the downward force, there is provided a rather strong spring 45 (FIG. 3). The spring 45 provides the tilt head 4 with a force for holding the steering wheel 92 in the most upwardly inclined position so that the driver can easily get in and out of a vehicle.

When a finger placed on the control lever 7 is released after completion of adjustment, the control lever 7 is returned to its original position (the position indicated by a solid line in FIG. 3) by the force of the spring 741 (and the spring 711). When the control lever 7 is returned to the original position, the tilt head 4 and the column head 31 (the movable column member 3) are both clamped by operations described hitherto in reverse.

During when the control lever 7 is not operated, the spring 741 applies a force to hold the control lever 7 distant from the steering wheel 92 and a force to hold the column clamp 21 and the tilt head clamp 41 in their respective clamped positions.

In the steering column of the present invention, the movable column member is clamped in relation to the stationary column member at two or more points which are spaced along the center axis of the movable column member. Accordingly, the clamping rigidity is high; and the movable column member is not loosened in relation to the stationary column member when subjected to vibrations or the like.

Further, wedges are moved by a cam mechanism including a cam and a pin; a cam mechanism including an elliptical cam bar, a through hole, and wedge end faces; or the like. Accordingly, a large travel stroke of the column clamp shaft in the axial direction is obtained with a small rotation angle of the column clamp shaft. As a result, a control lever can be operated easily. Additionally, adjustment of a column clamping force in order to compensate processing errors of components can be easily performed by controlling tightening torque of a nut.

Furthermore, the movable column member is clamped with a press plate interposed between the wedges and the movable column member, whereby biting will not occur between the wedges and the movable column member. Accordingly, stable clamping/unclamping operation is provided.

Furthermore, clamping/unclamping of a column and clamping/unclamping of tilt head can be operated by means of a single control lever. Consequently, the steering column having a simple structure increases operability without requiring a large space.

The steering column of the present invention is useful as a steering column for a vehicle, because in the steering column, clamping rigidity is high; a movable column member is not loosened in relation to a stationary column member when subjected to vibrations or the like; operations of a control lever for controlling a column clamping/unclamping mechanism is easy; adjustment of column clamping force is easy; and clamping/unclamping operation can be performed in a stable manner, because clamping/unclamping does not entail biting.

What is claimed is:

1. A steering column apparatus comprising:
a stationary column member having a body mount section by means of which the steering column apparatus is attached to a vehicle body;
a movable column member whose one end is supported on the stationary column member nonrotatably about a center axis and movably along the center axis;

a column head disposed on the other end of the movable column member;

a wheel shaft which is supported rotatable on the column head and which fixes a steering wheel on one end;

a column clamp for clamping and unclamping the movable column member in relation to the stationary column member at two or more points which are spaced along the center axis of the movable column member; and a control lever whose operation lever end is positioned in the vicinity of the steering wheel and which is capable of operating the column clamp, wherein the column clamp has a first wedge, a second wedge, and a column clamp shaft;

the first wedge and the second wedge are separated in a direction along the center axis of the movable column member, and are supported on the stationary column member movably in a direction parallel to and a direction orthogonal to the center axis of the movable column member;

tilt faces to be engaged with other tilt faces disposed on the stationary column member are formed on one end of the first wedge and one end of the second wedge, respectively;

clamping surfaces for clamping the movable column member are disposed on the other ends of the first wedge and the second wedge, respectively;

the column clamp shaft is disposed on the stationary column member rotatably about an axis which is parallel to the center axis of the movable column member, or movably in a direction parallel to the center axis;

rotation or displacement of the column clamp shaft allows the first wedge and the second wedge to move in a direction parallel to the center axis of the movable column member so as to narrow or widen a gap between the first wedge and the second wedge when the column clamp shaft is rotated or displaced; and the movable column member is clamped to the stationary column member such that the clamping surfaces on the other ends of the first wedge and the second wedge clamp the movable column member by narrowing or widening the gap between the first wedge and the second wedge.

2. The steering column apparatus according to claim 1, wherein the column clamp includes a column clamp shaft that rotates or displaces so as to allow the column clamp to clamp or unclamp the movable column member; and the steering column apparatus further includes: a spring that serves as a driving power source for rotating or displacing the column clamp shaft in a direction for clamping the movable column member in relation to the stationary column member.

3. The steering column apparatus according to claim 1, further comprising:

a tilt head supported on the column head so as to allow tilt;

wheel shaft rotatably supported on the tilt head;

a tilt head clamp for clamping and unclamping the tilt head in relation to the column head is disposed on the tilt head; and a mechanical transmittance device;

wherein the control lever is supported on the tilt head so as to allow sway;

the column clamp includes a column clamp shaft; and the mechanical transmittance device transmits a swaying motion of the control lever to the column clamp by converting the swaying motion of the control lever into rotation or displacement of the column clamp shaft; and the mechanical transmittance device transmits a swaying motion of the control lever to the tilt head clamp.

4. A steering column apparatus a stationary column member having a body mount section by means of which the steering column apparatus is attached to a vehicle body;

a movable column member whose one end is supported on the stationary column member nonrotatably about a center axis and movably along the center axis;

a column head disposed on the other end of the movable column member;

a wheel shaft which is supported rotatably on the column head and which fixes a steering wheel on one end;

a column clamp for clamping and unclamping the movable column member in relation to the stationary column member at two or more points which are spaced along the center axis of the movable column member; and a control lever whose operation lever end is positioned in the vicinity of the steering wheel and which is capable of operating the column clamp, wherein the column clamp has a first wedge, a second wedge, a press plate, and a column clamp shaft;

the first wedge and the second wedge are moved in a direction widening the gap between the same along the center axis of the movable column member, and are supported on the stationary column member movably in a direction parallel to and a direction orthogonal to the center axis of the movable column member;

flat faces contacting other flat faces which are disposed on the stationary column member are respectively formed on one end of the first wedge and one end of the second wedge;

the press plate is interposed between the other ends of the first wedge and the second wedge, and the movable column member;

tilt faces to be engaged with other tilt faces which are disposed on the press plate are formed on the other ends of the first wedge and the second wedge;

clamping surfaces for clamping the movable column member are disposed at two or more points which are spaced along the center axis of the movable column member;

the column clamp shaft is disposed on the stationary column member rotatably about an axis which is parallel to the center axis of the movable column member, or movably in a direction parallel to the center axis;

rotation or displacement of the column clamp shaft allows the first wedge and the second wedge to move in a direction parallel to the center axis of the movable column member so as to narrow or widen the gap between the first wedge and the second wedge; and the movable column member is clamped to the stationary column member such that the clamping surfaces of the press plate clamp the movable column member by narrowing or widening the gap between the first wedge and the second wedge.

5. A steering column apparatus a stationary column member having a body mount section by means of which the steering column apparatus is attached to a vehicle body;

a movable column member whose one end is supported on the stationary column member nonrotatably about a center axis and movably along the center axis;

a column head disposed on the other end of the movable column member;

a wheel shaft which is supported rotatably on the column head and which fixes a steering wheel on one end;

a column clamp for clamping and unclamping the movable column member in relation to the stationary column member at two or more points which are spaced along the center axis of the movable column member; and a control lever whose operation lever end is positioned in the vicinity of the steering wheel and which is capable of operating the column clamp, wherein the column clamp includes a first wedge, a second wedge, and a column clamp shaft;

the column clamp shaft is rotated in accordance with an operation of the control lever;

the first wedge and the second wedge are movable in a first direction along the movable column member and in a second direction crossing to the movable member; and the first wedge and the second wedge clamp the movable column member by moving closer to the movable column member in the second direction in accordance with a rotation of the column clamp shaft.

6. The steering column apparatus according to claim 5, wherein the column clamp includes a mechanism for moving the first wedge and the second wedge in the second direction in accordance with an adjustment of a distance between the first wedge and the second wedge in the first direction.

7. The steering column apparatus according to claim 6, wherein the column clamp further includes a cam mechanism disposed between the column clamp shaft and the first wedge or the second wedge; and the cam mechanism converts rotation of the column clamp shaft into an action of narrowing or widening the gap between 20 the first wedge and the second wedge.

8. The steering column apparatus according to claim 7, wherein the cam mechanism includes:

a cam formed on the first wedge or the second wedge; and a pin which is disposed on the column clamp shaft and engages with the cam.

9. The steering column apparatus according to claim 7, wherein the cam mechanism includes:

a through hole disposed in a direction orthogonal to a center axis of the column clamp shaft; and an elliptical cam bar which is inserted rotatably into the through hole and engages with the first wedge or the second wedge.

10. The steering column apparatus according to claim 6, wherein the column clamp further includes a screw disposed between the column clamp shaft and the first wedge or the second wedge; and the mechanism converts rotation of the column clamp shaft into an action of narrowing or widening the gap between the first wedge and the second wedge is a screw formed.

11. The steering column apparatus according to claim 6, wherein the column clamp further includes a nut which is screwed on a threaded portion of the column clamp shaft; and the distance between the first wedge and the second wedge is adjusted by the nut, to thus adjust clamping force for clamping the movable column member in relation to the stationary column member.

12. The steering column apparatus according to claim 6, wherein the column clamp further includes a mechanism for converting rotation of the column clamp shaft into an action of narrowing or widening the gap between the first wedge and the second wedge; and the mechanism for converting includes a first screw formed between the column, clamp shaft and the first wedge, and a second screw whose lead is reverse to that of the first screw and which is formed between the column clamp shaft and the second wedge.

13. The steering column apparatus according to claim 12, wherein when the movable column member is unclamped in relation to the stationary column member by an action where the first wedge and the second wedge are moved in a direction for narrowing or widening the gap between the same, a contact face disposed on the stationary column member contacts the first wedge or the second wedge, thereby blocking the first wedge or the second wedge from displacing a predetermined distance or more in a direction for narrowing or widening the gap between the first wedge and the second wedge.

14. The steering column apparatus according to claim 6, further comprising:

a spring disposed between the first wedge and the second wedge;

wherein the spring constantly applies force in a direction for unclamping the first wedge and the second wedge.

* * * * *